United States Patent
Tamura

(10) Patent No.: US 10,968,999 B2
(45) Date of Patent: Apr. 6, 2021

(54) DIFFERENTIAL DEVICE FOR 4-WHEEL-DRIVE VEHICLE

(71) Applicant: TOYOTA JIDOSHA KABUSHIKI KAISHA, Toyota (JP)

(72) Inventor: Hiroshi Tamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 555 days.

(21) Appl. No.: 15/888,795

(22) Filed: Feb. 5, 2018

(65) Prior Publication Data

US 2018/0223983 A1 Aug. 9, 2018

(30) Foreign Application Priority Data

Feb. 6, 2017 (JP) .............................. JP2017-019907

(51) Int. Cl.
*F16H 57/04* (2010.01)
*B60K 17/16* (2006.01)
(Continued)

(52) U.S. Cl.
CPC ......... *F16H 57/0427* (2013.01); *B60K 17/02* (2013.01); *B60K 17/06* (2013.01);
(Continued)

(58) Field of Classification Search
CPC ........ B60K 17/02; B60K 17/06; B60K 17/16; B60K 17/165; B60K 17/344; B60K 17/346; B60K 17/348; B60K 17/352; B60K 23/08; F16H 2057/02052; F16H 48/00; F16H 48/19; F16H 48/20; F16H 48/22; F16H 48/42; F16H 57/037; F16H 57/04;
(Continued)

(56) References Cited

U.S. PATENT DOCUMENTS 3,901,102 A * 8/1975 Manwaring ............. F16H 48/08
475/246
4,612,818 A * 9/1986 Hori ..................... F16H 57/0457
184/6.12
(Continued)

FOREIGN PATENT DOCUMENTS

FR 1499426 A * 10/1967 ............. B60K 17/16
GB 2192957 A * 1/1988 ......... F16H 57/0483
(Continued)

*Primary Examiner* — Joseph Brown
(74) *Attorney, Agent, or Firm* — Oliff PLC

(57) ABSTRACT

A differential device for a 4-wheel-drive vehicle wherein a portion of a drive power source drive force transmitted to left and right main drive wheels is transmitted to left and right auxiliary drive wheels through a propeller shaft which is disconnectable from a power transmitting path between the main drive wheels and drive power source, the differential device distributes the drive force from the propeller shaft to the auxiliary drive wheels, and selectively connects and disconnects the propeller and an output shaft to and from each other, the output shaft. The differential device includes a side oil seal between the output shaft and a casing, a side bearing adjacent to the seal in an output shaft axial direction such that the output shaft is rotatably supported by the casing via the bearing, and an oil slinger axially adjacent to the bearing so the slinger is rotated with the output shaft.

6 Claims, 4 Drawing Sheets

(51) Int. Cl.
    *B60K 23/08*       (2006.01)
    *F16H 57/037*     (2012.01)
    *F16H 57/021*     (2012.01)
    *F16H 48/19*      (2012.01)
    *B60K 17/06*      (2006.01)
    *B60K 17/02*      (2006.01)
    *F16H 48/30*      (2012.01)
    *B60K 17/348*     (2006.01)
    *B60K 17/344*     (2006.01)
    *F16H 48/00*      (2012.01)

(52) U.S. Cl.
    CPC ............ B60K 17/16 (2013.01); B60K 17/165 (2013.01); B60K 17/348 (2013.01); B60K 17/352 (2013.01); B60K 23/08 (2013.01); F16H 48/19 (2013.01); F16H 57/021 (2013.01); F16H 57/037 (2013.01); F16H 57/0424 (2013.01); B60K 17/344 (2013.01); F16H 48/00 (2013.01); F16H 57/04 (2013.01)

(58) Field of Classification Search
    CPC ............... F16H 57/042; F16H 57/0424; F16H 57/0427; F16H 57/043; F16H 57/0469; F16H 57/0472; F16H 57/0493; F16H 57/0495; F16H 2048/082; F16H 57/0483
    USPC .................................. 475/160, 231; 180/248
    See application file for complete search history.

(56) References Cited

U.S. PATENT DOCUMENTS

| | | | | |
|---|---|---|---|---|
| 4,656,885 A | * | 4/1987 | Hori | F16C 19/548 184/6.12 |
| 4,677,871 A | * | 7/1987 | Taniyama | F16H 57/0483 74/467 |
| 5,709,135 A | * | 1/1998 | Baxter | B60K 17/20 475/160 |
| 6,074,321 A | * | 6/2000 | Maeda | B60K 1/00 475/221 |
| 6,200,037 B1 | * | 3/2001 | Braun | B60B 27/001 384/466 |
| 6,964,320 B2 | * | 11/2005 | Metelues | F16H 57/0483 184/6.12 |
| 8,534,770 B2 | * | 9/2013 | White | B60B 27/001 301/105.1 |
| 8,657,073 B2 | * | 2/2014 | Matsumoto | F16H 57/0483 184/11.1 |
| 9,822,869 B1 | * | 11/2017 | Carr | F16H 57/0427 |
| 2003/0121750 A1 | * | 7/2003 | Teraoka | F16H 48/22 192/93 A |
| 2006/0032692 A1 | * | 2/2006 | Ima | B60K 17/344 180/249 |
| 2007/0051579 A1 | * | 3/2007 | Wu | F16D 23/12 192/70.27 |
| 2007/0295557 A1 | | 12/2007 | Aldridge | |
| 2009/0110340 A1 | * | 4/2009 | Ito | F16C 33/46 384/571 |
| 2013/0199883 A1 | * | 8/2013 | Akiba | F16D 21/02 192/48.609 |
| 2013/0303323 A1 | * | 11/2013 | Zink | F16H 57/029 475/160 |
| 2016/0101689 A1 | | 4/2016 | Yoshimura et al. | |
| 2017/0299044 A1 | * | 10/2017 | Carr | F16H 48/42 |

FOREIGN PATENT DOCUMENTS

JP          S50-76242 U      7/1975
JP          2016-074370 A    5/2016

\* cited by examiner

DIFFERENTIAL DEVICE FOR 4-WHEEL-DRIVE VEHICLE

This application claims priority from Japanese Patent Application No. 2017-019907 filed on Feb. 6, 2017, the disclosure of which is herein incorporated by reference in its entirety.

FIELD OF THE INVENTION

The present invention relates in general to a differential device for a 4-wheel-drive vehicle, and more particularly to a lubrication system of the differential device.

BACKGROUND OF THE INVENTION

There is known a 4-wheel-drive vehicle in which a portion of a drive force to be transmitted from a drive power source to left and right main drive wheels can be transmitted to left and right auxiliary drive wheels through a propeller shaft which is disconnectable from a power transmitting path. A known differential device for such a 4-wheel-drive vehicle, which is configured to distribute the drive force from the propeller shaft to the left and right auxiliary drive wheels, is provided with a connecting/disconnecting mechanism for connecting and disconnecting an input rotary member in the form of a ring gear of the differential device and an output rotary member in the form of an output shaft of the differential device to and from each other. JP-2016-74370A discloses a rear-wheel differential device which is provided with a connecting/disconnecting mechanism in the form of a positive clutch to connect and disconnect the ring gear and the output shaft to and from each other, as needed, according to a running state of the vehicle.

SUMMARY OF THE INVENTION

By the way, a side oil seal disposed between the output shaft and a casing is conventionally lubricated with a lubricant stirred up by the ring gear. While the propeller shaft is disconnected from the power transmitting path to cut power transmission between the ring gear and the output shaft from each other, the ring gear is held stationary, giving rise to a problem that the side oil seal disposed between the output shaft and the casing cannot be lubricated.

The present invention was made in view of the background art described above. It is therefore an object of the present invention to provide a differential device for a 4-wheel-drive vehicle wherein a drive force is distributed from a propeller shaft to left and right auxiliary drive wheels, which differential device can be lubricated even while the propeller shaft is held stationary.

The object indicated above is achieved according to the following modes of the present invention:

According to a first mode of the invention, there is provided a differential device for a 4-wheel-drive vehicle wherein a portion of a drive force of a drive power source transmitted to left and right main drive wheels is transmitted to left and right auxiliary drive wheels through a propeller shaft which is disconnectable from a power transmitting path between the main drive wheels and the drive power source, the differential device being configured to distribute the drive force from the propeller shaft to the left and right auxiliary drive wheels, and to selectively connect and disconnect the propeller shaft and an output shaft to and from each other, the output shaft being operatively connected to the left and right auxiliary drive wheels, the differential device comprising: a side oil seal disposed between the output shaft and a casing; a side bearing disposed adjacent to the side oil seal in an axial direction of the output shaft, such that the output shaft is supported in a rotatable manner by the casing via the side bearing; and an oil slinger disposed axially adjacent to the side bearing, such that the oil slinger is rotated with the output shaft.

According to a second mode of the invention, the differential device for the 4-wheel-drive vehicle (4-wheel-drive vehicle differential device) according to the first mode of the invention is configured such that the oil slinger is disposed on one side of the side bearing remote from the side oil seal, and such that the casing has oil grooves formed in a surface thereof in contact with the side bearing, such that the oil grooves extend in the axial direction of the output shaft.

According to a third mode of the invention, the 4-wheel-drive vehicle differential device according to the first or second mode of the invention is configured such that the oil slinger takes the form of a disc having a radially outer portion which is an elastic member.

According to a fourth mode of the invention, the 4-wheel-drive vehicle differential device according to the third mode of the invention is configured such that the oil slinger has an outside diameter larger than a smallest one of inside diameters of an annular member within which the oil slinger is moved when the oil slinger is installed in position.

According to a fifth mode of the invention, the 4-wheel-drive vehicle differential device according to any one of the first through fourth modes of the invention is configured such that the oil slinger has a radially inner portion interposed between an inner race of the side bearing and a spring, and the radially inner portion of the oil slinger is held in pressing contact with the inner race of the side bearing with a biasing force of the spring.

In the 4-wheel-drive vehicle differential device according to the first mode of the invention, the oil slinger is disposed axially adjacent to the side bearing, such that the oil slinger is rotated with the output shaft. Accordingly, the lubricant is stirred up by the rotating oil slinger, so that the side oil seal is lubricated with the lubricant, whereby the side oil seal is lubricated even while a ring gear of the differential device is held stationary.

According to the second mode of the invention, the 4-wheel-drive vehicle differential device is configured such that the lubricant stirred up by the rotating oil slinger can be delivered to the side oil seal through the oil grooves.

According to the third mode of the invention, the 4-wheel-drive vehicle differential device is configured such that the radially outer portion of the oil slinger is an elastic member, so that the oil slinger can be installed owing to elastic deformation of its radially outer portion even where the radially outer portion would otherwise interfere with any member during installation of the oil slinger.

According to the fourth mode of the invention, the 4-wheel-drive vehicle differential device is configured such that the oil slinger can be installed in position owing to the elastic deformation of its radially outer portion when the oil slinger is moved within the annular member during its installation, even where the outside diameter of the radially outer portion of the oil slinger is larger than the smallest inside diameter of the annular member.

According to the fifth mode of the invention, the 4-wheel-drive vehicle differential device is configured such that the radially inner portion of the oil slinger is held in pressing contact with the inner race of the side bearing by the biasing force of the spring, so that the oil slinger can be rotated together with the inner race and the output shaft as a unit.

DETAILED DESCRIPTION OF PREFERRED EMBODIMENT

A preferred embodiment of this invention will be described in detail by reference to the drawings. It is to be understood that the drawings are simplified and transformed as needed, and do not necessarily accurately represent the dimensions and shapes of various elements of the embodiment.

Embodiment

Figure 1:
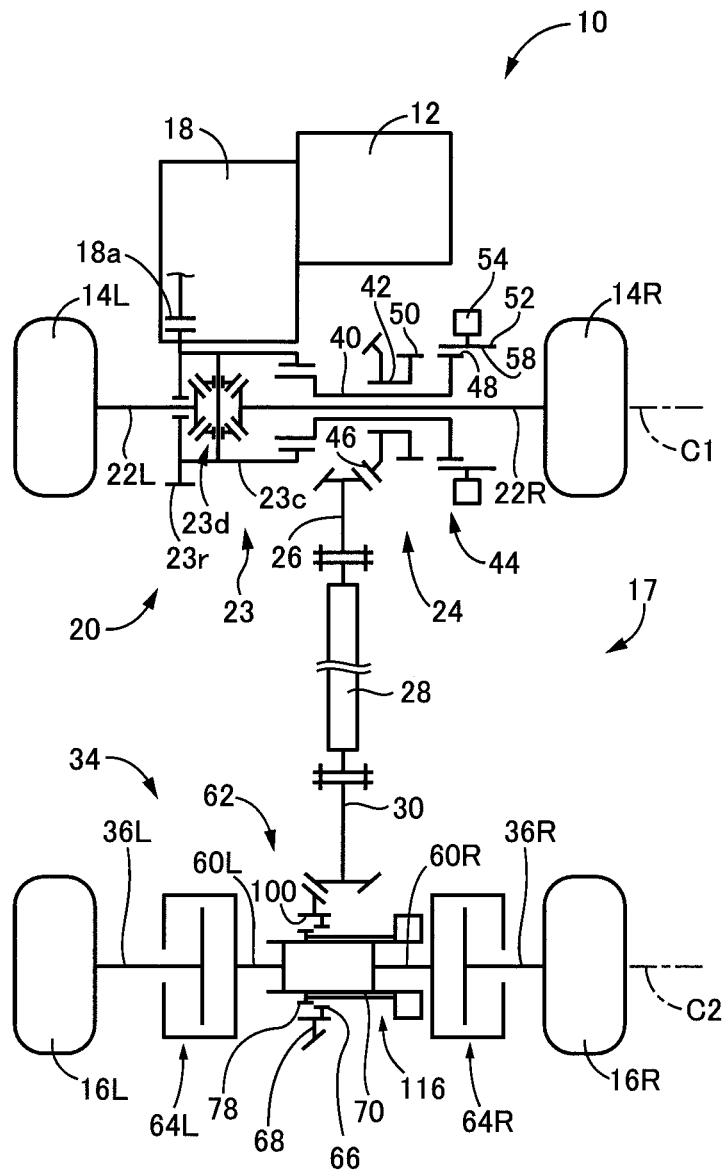
FIG. 1 is a schematic view showing an arrangement of a 4-wheel-drive vehicle according to one embodiment of this invention.

Reference is first made to FIG. 1, which is the schematic view showing an arrangement of a 4-wheel-drive vehicle 10 according to one embodiment of this invention. As shown in FIG. 1, the 4-wheel-drive vehicle 10 is provided with a 4-wheel-drive power transmitting system 17 (hereinafter referred to as "power transmitting system 17") which is basically of an F-F type including: a drive power source in the form of an engine 12; a first power transmitting path through which a drive force of the engine 12 is transmitted to main drive wheels in the form of left and right front wheels 14L and 14R (hereinafter referred to as "front wheels 14", unless otherwise specified); and a second power transmitting path through which the drive force of the engine 12 is transmitted to auxiliary drive wheels in the form of left and right wheels 16L and 16R (hereinafter referred to as "rear wheels 16", unless otherwise specified). The power transmitting system 17 is configured to transmit the drive force of the engine 12 to the front wheels 14, and to transmit a portion of the drive force of the engine 12 to the rear wheels 16 through a propeller shaft 28. With respect this 4-wheel-drive vehicle 10 of the present invention, it is noted that the engine 12 corresponds to the drive power source, and the front wheels 14 correspond to the main drive wheels while the rear wheels 16 correspond to the auxiliary drive wheels.

The power transmitting system 17 includes: an automatic transmission 18; a front-wheel drive force distributing unit 20 configured to distribute the drive force of the engine 12 to the left and right front wheels 14L and 14R; and a rear-wheel drive force distributing unit 34 configured to distribute the drive force from the propeller shaft 28 to the left and right rear wheels 16L and 16R. When the power transmitting system 17 is placed in a 2-wheel-drive state, the drive force of the engine 12 is transmitted through the first power transmitting path, namely, through the automatic transmission 18, the front-wheel drive force distributing unit 20 and left and right axles 22L and 22R (hereinafter referred to as "axles 22", unless otherwise specified), to the left and right front wheels 14L and 14R. In the 2-wheel-drive state, the drive force of the engine 12 is not transmitted through the second power transmitting path, namely, not transmitted to the propeller shaft 28 and the rear-wheel drive force distributing unit 34. When the power transmitting system 17 is placed in a 4-wheel-drive state, the drive force of the engine 12 is transmitted through not only the first power transmitting path but also the second power transmitting path, such that a portion of the drive force of the engine 12 is transmitted to the left and right rear wheels 16L and 16R through the propeller shaft 28 and the rear-wheel drive force distributing unit 34 in addition to the front wheels 14. It is noted that a torque converter, a clutch or any other fluid-operated power transmitting device (not shown in FIG. 1) is disposed between the engine 12 and the automatic transmission 18. It is noted that the rear-wheel drive force distributing unit 34 corresponds to the differential device for the 4-wheel-drive vehicle of the present invention.

Examples of the automatic transmission 18 include: a step-variable automatic transmission which has a plurality of planetary gear sets and a plurality of frictional coupling devices (clutches and brakes) and which is shifted to a selected one of speed positions with selective engaging actions of the frictional coupling devices; a step-variable automatic transmission of a permanent-meshing parallel-axes type which is shifted to a selected one of speed positions with operations of a shift actuator and a select actuator; and a continuously variable transmission a speed ratio of which is continuously variable with controlled changes of effective diameters of a pair of variable-diameter pulleys which are connected to each other through a transmission belt and the effective diameters of which are variable. Since the automatic transmission 18 is known in the art, its construction and operation will not be further described in detail.

The front-wheel drive force distributing unit 20 includes a front-wheel differential mechanism 23 and a transfer 24 which are disposed rotatably about the axles 22 for the front wheels 14. The front-wheel differential mechanism 23 is a well known differential gear device having a ring gear 23$r$ meshing with an output gear 18$a$ of the automatic transmission 18, a differential casing 23$c$ rotating together with the ring gear 23$r$ about an axis C1 of the axles 22, and a differential mechanism 23$d$ consisting of bevel gears accommodated within the differential casing 23$c$. When a rotary motion of the output gear 18$a$ of the automatic transmission 18 is transmitted to the differential mechanism 23$d$ through the ring gear 23$r$ and the differential casing 23$c$, the rotary motion is transmitted to the left and right axles 22L and 22R while a difference between rotating speeds of the axles 22R and 22L is permitted. The differential casing 23$c$ is splined to an input rotary member 40 of the transfer 24, at its one axial end in the direction of its axis C1.

The transfer 24 includes the input rotary member 40 rotated with the differential casing 23$c$ about the axis C1, an output rotary member 42 operatively connected to the propeller shaft 28, and a first positive clutch 44 configured to connect and disconnect the input rotary member 40 and the output rotary member 42 to and from each other. When the first positive clutch 44 is placed in a released state, the input rotary member 40 and the output rotary member 42 are disconnected from each other, so that the drive force of the engine 12 is not transmitted to the propeller shaft 28 and the rear-wheel drive force distributing unit 34. Namely, the propeller shaft 28 is disconnected from a power transmitting path between the front wheels 14 and the rear wheels 16, in the released state of the first positive clutch 44. When the first positive clutch 44 is placed in an engaged state, on the other hand, the input rotary member 40 and the output rotary member 42 are connected to each other, so that a portion of the drive force of the engine 12 is distributed to the rear wheels 16 through the propeller shaft 28 and the rear-wheel drive force distributing unit 34. That is, the front-wheel drive force distributing unit 20 and the rear-wheel drive force distributing unit 34 are connected to each other by the propeller shaft 28.

The input rotary member 40 is a cylindrical member disposed radially outwardly of the axle 22R, and is rotatable about the axis C1 coaxial with the axle 22R. The input rotary member 40 is splined at its one axial end in the direction of the axis C1, to the differential casing 23c of the front-wheel differential mechanism 23. The first positive clutch 44 has external teeth 48 formed at the other axial end of the input rotary member 40 in the direction of the axis C1.

The output rotary member 42 is a cylindrical member disposed radially outwardly of the input rotary member 40, and is rotatable about the axis C1 coaxial with the axle 22R. The output rotary member 42 has a ring gear 46 which is formed at its one axial end in the direction of the axis C1 and which is held in meshing engagement with a driven pinion 26 connected to one end of the propeller shaft 28. The first positive clutch 44 also has external teeth 50 formed at the other axial end of the output rotary member 42 in the direction of the axis C1.

The first positive clutch 44 is a connecting/disconnecting device for selectively connecting and disconnecting the input rotary member 40 and the output rotary member 42 to and from each other. The first positive clutch 44 includes: the input rotary member 40 on which the external teeth 48 are formed; the output rotary member 42 on which the external teeth 50 are formed; a cylindrical sleeve 52 having internal teeth 58 which are held in meshing engagement with the external teeth 48 and which are engageable also with the external teeth 50 as a result of a movement of the cylindrical sleeve 52 in the direction of the axis C1; and a clutch actuator 54 provided to generate a thrust force for moving the sleeve 52 in the direction of the axis C1. The clutch actuator 54 is an electrically controllable actuator incorporating a solenoid coil. The first positive clutch 44 is also provided with a synchronizing mechanism (not shown) for synchronizing rotary motions of the input and output rotary members 40 and 42 upon meshing engagement of the internal teeth 58 with the external teeth 50. It is noted that FIG. 1 shows the first positive clutch 44 placed in its released state. When the sleeve 52 is moved in the direction of the axis C1 toward the left front wheel 14L (i.e., in the leftward direction as seen in FIG. 1), the first positive clutch 44 which has been placed in the released state is brought into its engaged state in which the external teeth 50 and the internal teeth 58 mesh with each other, so that the input and output rotary members 40 and 42 are connected to each other.

The rear-wheel drive force distributing unit 34 is disposed in a power transmitting path from the propeller shaft 28 to the left and right rear wheels 16L and 16R, and functions to distribute the drive force from the propeller shaft 28 to the left and right rear wheels 16 and also to connect and disconnect the propeller shaft 28 and an output shaft 70 (described below) to and from each other. The rear-wheel drive force distributing unit 34 includes a second positive clutch 62 for selectively connecting and disconnecting the propeller shaft 28 and the output shaft 70 to and from each other, and a left coupling 64L and a right coupling 64R in the form of electronically controlled couplings for controlling torques to be transmitted from the output shaft 70 to the respective left and right rear wheels 16L and 16R. The left coupling 64L is disposed between the output shaft 70 and the left axle 36L, while the right coupling 64R is disposed between the output shaft 70 and the right axle 36R. A proportion of the torques to be distributed to the left and right rear wheels 16 is adjusted by controlling torque capacities of the left and right couplings 64L and 64R.

The rear-wheel drive force distributing unit 34 receives a drive force from a ring gear 68 meshing with a drive pinion 30 connected to the propeller shaft 28. The ring gear 68 is constituted by a bevel gear in the form of a hypoid gear, for example.

The second positive clutch 62 is provided to selectively connect and disconnect the ring gear 68 and the output shaft 70 to and from each other. The second positive clutch 62 includes: a cylindrical portion 100 (described below) connected to the ring gear 68 and having internal teeth 66; a connecting/disconnecting sleeve 112 (described below and shown in FIG. 2) which is splined to the output shaft 70 splined at its opposite ends to a clutch drum 60L and a clutch drum 60R (hereinafter referred to as "clutch drums 60", unless otherwise specified), and which has external teeth 78 engageable with the internal teeth 66; and a switching mechanism 116 configured to move the connecting/disconnecting sleeve 112 in the direction of an axis C2 of the output shaft 70 (hereinafter referred simply as "direction of the axis C2"), to selectively place the second positive clutch 62 in its engaged state in which the external teeth 78 and the internal teeth 66 are held in meshing engagement with each other, and in its released state in which the external teeth 78 and the internal teeth 66 are not held in meshing engagement with each other.

In a 2-wheel-drive state of the 4-wheel-drive vehicle 10 constructed as described above, the first positive clutch 44 and the second positive clutch 62 are both placed in their released states, so that the transfer 24 and the propeller shaft 28 are disconnected from each other, while the propeller shaft 28 and the output shaft 70 are disconnected from each other. At this time, no drive force is transmitted to the propeller shaft 28, so that the propeller shaft 28 is held stationary. Accordingly, the propeller shaft 28 is prevented from being rotated with the rear wheels 16 in the 2-wheel-drive state and thus, fuel efficiency is improved. In a 4-wheel-drive state of the vehicle 10, the first positive clutch 44 and the second positive clutch 62 are both placed in their engaged states, so that the drive force of the engine 12 is transmitted to the rear-wheel drive force distributing unit 34 through the transfer 24 and the propeller shaft 28, and is suitably distributed to the left and right rear wheels 16 according to the torque capacities of the left and right couplings 64L and 64R.

Figure 2:
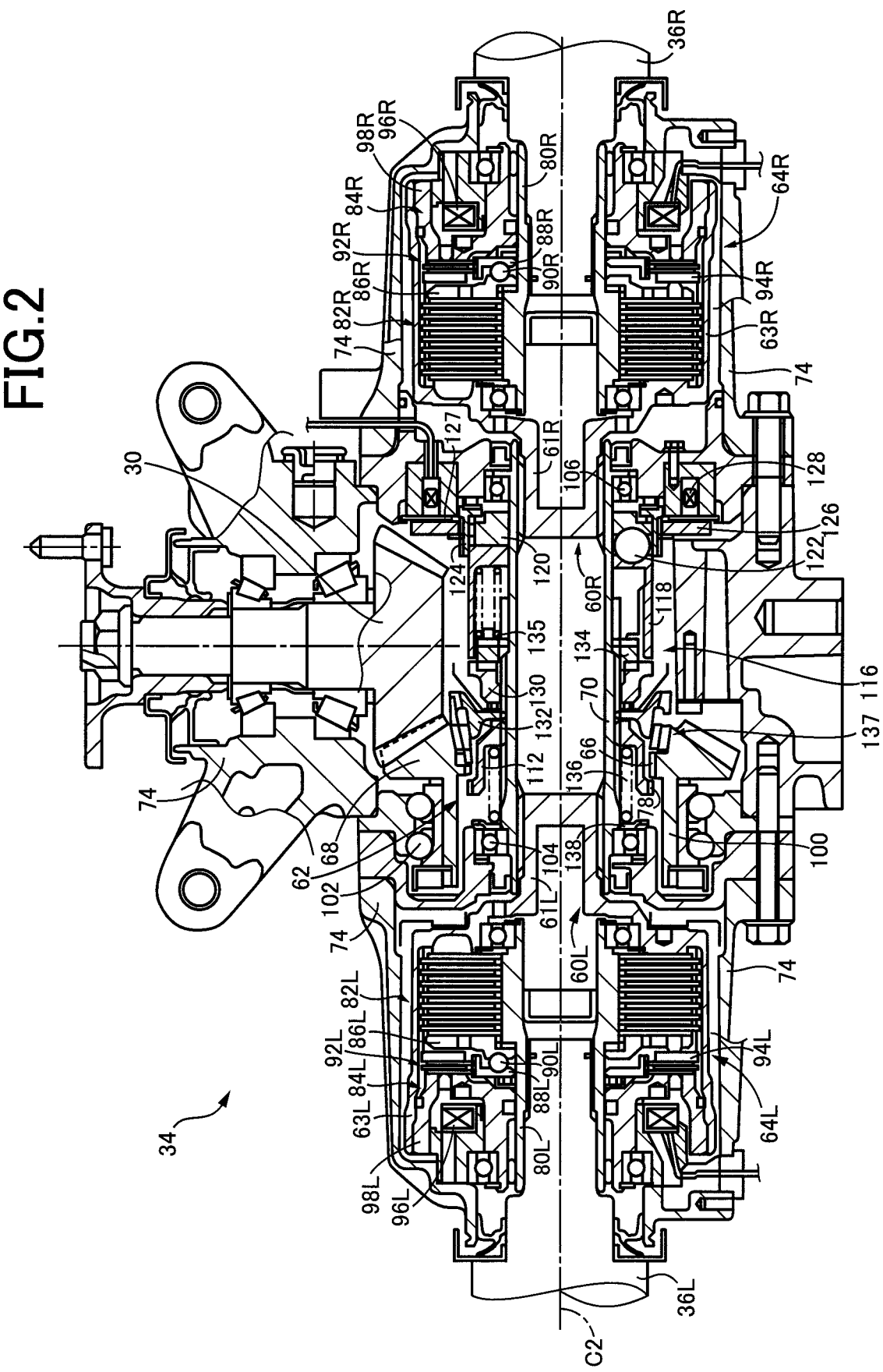
FIG. 2 is a cross sectional view of a rear-wheel drive force distributing unit shown in FIG. 1.

Reference is now made to FIG. 2, which is the cross sectional view of the rear-wheel drive force distributing unit 34 shown in FIG. 1. As shown in FIG. 2, the rear-wheel drive force distributing unit 34 is disposed within a casing 74 and around the axis C2. The rear-wheel drive force distributing unit 34 includes: the second positive clutch 62 disposed between the drive pinion 30 connected to the propeller shaft 28, and the output shaft 70; the left coupling 64L disposed between the output shaft 70 and the left axle 36L; and the right coupling 64R disposed between the output shaft 70 and the right axle 36R.

The left coupling 64L includes: the clutch drum 60L splined to the output shaft 70; a clutch hub 80L splined to the left axle 36L; main frictional coupling elements 82L disposed between the clutch drum 60L and the clutch hub 80L;

and a pressing mechanism 84L provided to press the main frictional coupling elements 82L against each other.

The clutch drum 60L is a stepped cylindrical member which is closed at one of its opposite axial ends and which is disposed rotatably about the axis C2. Described more specifically, the clutch drum 60L has a small-diameter portion 61L on the side of the closed axial end (on the side of the right axle 36R in the direction of the axis C2), and a large-diameter portion 63L on the side of the open axial end (on the side of the left axle 36L in the direction of the axis C2). The large-diameter portion 63L has a larger diameter than the small-diameter portion 61L. The small-diameter portion 61L is disposed radially inwardly of the output shaft 70, and is splined on its outer circumferential surface to the inner circumferential surface of the output shaft 70. Accordingly, the clutch drum 60L and the output shaft 70 are rotated about the axis C2 together with each other as a unit. The large-diameter portion 63L is disposed so as to surround the main frictional coupling elements 82L and the pressing mechanism 84L.

The clutch hub 80L is a cylindrical member disposed rotatably about the axis C2, and is splined on its inner circumferential surface to the left axle 36L, so that the clutch hub 80L and the left axle 36L are rotated together with each other as a unit.

The main frictional coupling elements 82L and the pressing mechanism 84L are accommodated within a space formed between the large-diameter portion 63L of the clutch drum 60L and the clutch hub 80L. The main frictional coupling elements 82L consist of a plurality of outer friction plates splined to the inner circumferential surface of the large-diameter portion 63L, and a plurality of inner friction plates splined to the outer circumferential surface of the clutch hub 80L. The outer friction plates and the inner friction plates are alternately disposed adjacent to each other.

The pressing mechanism 84L includes: a first cam member 86L functioning as a piston for pressing the main frictional coupling elements 82L against each other; a second cam member 88L; a plurality of balls 90L interposed between the first cam member 86L and the second cam member 88L; auxiliary frictional coupling elements 92L disposed radially outwardly of the second cam member 88L; an armature 94L, a solenoid coil 96L and a housing 98L which are disposed adjacent to the auxiliary frictional coupling elements 92L in the direction of the axis C2.

The first cam member 86L takes the form of a disc which is splined at its radially inner portion to the clutch hub 80L, and the radially outer portion of which is adjacent to the main frictional coupling elements 82L in the direction of the axis C2. The first cam member 86L has a plurality of ball retainer grooves formed in its surface facing the second cam member 88L in the direction of the axis C2. The balls 90L are partially accommodated in the ball retainer grooves.

The second cam member 88L is an annular member slidably fitted at its radially inner portion on the outer circumferential surface of the clutch hub 80L. The second cam member 88L has a plurality of ball retainer grooves formed in its surface facing the first cam member 86L in the direction of the axis C2. The balls 90L are partially accommodated in these ball retainer grooves. A radially inner friction plate of the auxiliary frictional coupling elements 92L is splined to the outer circumferential surface of the second cam member 88L.

The balls 90L are interposed and sandwiched between the ball retainer grooves formed in the first cam member 86L and the ball retainer grooves formed in the second cam member 88L, such that the balls 90L are partly accommodated in those ball retainer grooves. The ball retainer grooves are formed in the circumferential direction of the first and second cam members 86L and 88L, over a part of the circumference of each cam member 86L, 88L, such that the depth of each ball retainer groove decreases in the directions towards its opposite ends. When rotating speeds of the first and second cam members 86L and 88L have a difference, the balls 90L are moved toward one of the opposite ends of the ball retainer grooves, so that the balls 90L force the first and second cam members 86L and 88L so as to be moved away from each other in the opposite directions of the axis C2.

The auxiliary frictional coupling elements 92L consist of the radially inner friction plate in the form of a disc splined to the outer circumferential surface of the second cam member 88L, and radially outer friction plates in the form of discs splined to the inner circumferential surface of the large-diameter portion 63L of the clutch drum 60L. These inner and outer friction plates are alternately disposed adjacent to each other.

The armature 94L takes the form of a disc which is disposed adjacent to the auxiliary frictional coupling elements 92L in the direction of the axis C2. The armature 94L is splined on its outer circumferential surface to the inner circumferential surface of the large-diameter portion 63L of the clutch drum 60L. The solenoid coil 96L is fixed to the casing 74 so that the solenoid coil 96L is rotated with the casing 74.

In the left coupling 64L constructed as described above, the torque capacities of the auxiliary frictional coupling elements 92L and the main frictional coupling elements 82L are zero while the solenoid coil 96L is placed in a de-energized state without application of an electric current thereto. Accordingly, a drive force is not transmitted from the clutch drum 60L to the clutch hub 80L, so that the drive force of the engine 12 is not transmitted to the rear wheel 16L.

When the solenoid coil 96L is energized with an electric current applied thereto, on the other hand, a magnetic flux is generated around the solenoid coil 96L, so that the armature 94L is attracted toward the auxiliary frictional coupling elements 92L, so that the armature 94L presses the auxiliary frictional coupling elements 92L against each other. Accordingly, the auxiliary frictional coupling elements 92L have a torque capacity, so that the front and rear wheels 14 and 16 have a difference between their rotating speeds, whereby the first and second cam members 86L and 88L have a difference between their rotating speeds, and the balls 90L press the first cam member 86L toward the main friction coupling elements 82L, so that the first cam member 86L is moved toward the main friction coupling elements 82L, to press the main friction coupling elements 82L against each other. As a result, the main friction coupling elements 82L have a torque capacity, so that a drive force is transmitted from the clutch drum 60L to the clutch hub 80L through the main frictional coupling elements 82L. As the amount of electric current applied to the solenoid coil 96L increases, a force of attraction of the armature 94L increases, and the difference between the rotating speeds of the first and second cam members 86L and 88L increases, so that a force of the first cam member 86L to press the main frictional coupling elements 82L against each other increases. Accordingly, the torque capacity of the main frictional coupling elements 82L and the drive force to be transmitted from the clutch drum 60L to the clutch hub 80L through the main frictional coupling elements 82L increase with an increase of the amount of electric current applied to the solenoid coil 96L.

The right coupling 64R includes: the clutch drum 60R splined to the output shaft 70; a clutch hub 80R splined to the right axle 36R; main frictional coupling elements 82R disposed between the clutch drum 60R and the clutch hub 80R; and a pressing mechanism 84R provided to press the main frictional coupling elements 82R against each other.

The clutch drum 60R is a stepped cylindrical member which is closed at one of its opposite axial ends and which is disposed rotatably about the axis C2. Described more specifically, the clutch drum 60R has a small-diameter portion 61R on the side of the closed axial end (on the side of the left axle 36L in the direction of the axis C2), and a large-diameter portion 63R on the side of the open axial end (on the side of the right axle 36R in the direction of the axis C2). The large-diameter portion 63R has a larger diameter than the small-diameter portion 61R. The small-diameter portion 61R is disposed radially inwardly of the output shaft 70, and is splined on its outer circumferential surface to the inner circumferential surface of the output shaft 70. Accordingly, the clutch drum 60R and the output shaft 70 are rotated about the axis C2 together with each other as a unit. The large-diameter portion 63R is disposed so as to surround the main frictional coupling elements 82R and the pressing mechanism 84R.

The clutch hub 80R is a cylindrical member disposed rotatably about the axis C2, and is splined on its inner circumferential surface to the right axle 36R, so that the clutch hub 80R and the right axle 36R are rotated together with each other as a unit.

The main frictional coupling elements 82R and the pressing mechanism 84R are accommodated within a space formed between the large-diameter portion 63R of the clutch drum 60R and the clutch hub 80R. The main frictional coupling elements 82R consist of a plurality of outer friction plates splined to the inner circumferential surface of the large-diameter portion 63R, and a plurality of inner friction plates splined to the outer circumferential surface of the clutch hub 80R. The outer friction plates and the inner friction plates are alternately disposed adjacent to each other.

The pressing mechanism 84R includes: a first cam member 86R functioning as a piston for pressing the main frictional coupling elements 82R against each other; a second cam member 88R; a plurality of balls 90R interposed between the first cam member 86R and the second cam member 88R; auxiliary frictional coupling elements 92R disposed radially outwardly of the second cam member 88R; an armature 94R, a solenoid coil 96R and a housing 98R which are disposed adjacent to the auxiliary frictional coupling elements 92R in the direction of the axis C2.

The first cam member 86R takes the form of a disc which is splined at its radially inner portion to the clutch hub 80R, and the radially outer portion of which is adjacent to the main frictional coupling elements 82R in the direction of the axis C2. The first cam member 86R has a plurality of ball retainer grooves formed in its surface facing the second cam member 88R in the direction of the axis C2. The balls 90R are accommodated in the ball retainer grooves.

The second cam member 88R is an annular member slidably fitted at its radially inner portion on the outer circumferential surface of the clutch hub 80R. The second cam member 88R has a plurality of ball retainer grooves formed in its surface facing the first cam member 86R in the direction of the axis C2. The balls 90R are partially accommodated in these ball retainer grooves. A radially inner friction plate of the auxiliary frictional coupling elements 92R is splined to the outer circumferential surface of the second cam member 88R.

The balls 90R are disposed between the ball retainer grooves formed in the first cam member 86R and the ball retainer grooves formed in the second cam member 88R, such that the balls 90R are partly accommodated in those ball retainer grooves. The ball retainer grooves are formed in the circumferential direction of the first and second cam members 86R and 88R, over a part of the circumference of each cam member 86R, 88R, such that the depth of each ball retainer groove decreases in the directions towards its opposite ends. When rotating speeds of the first and second cam members 86R and 88R have a difference, the balls 90R are moved toward one of the opposite ends of the ball retainer grooves, so that the balls 90R force the first and second cam members 86R and 88R so as to be moved away from each other in the opposite directions of the axis C2.

The auxiliary frictional coupling elements 92R consist of the radially inner friction plate in the form of a disc splined to the outer circumferential surface of the second cam member 88R, and radially outer friction plates in the form of discs splined to the inner circumferential surface of the large-diameter portion 63R of the clutch drum 60R. These inner and outer friction plates are alternately disposed adjacent to each other.

The armature 94R takes the form of a disc which is disposed adjacent to the auxiliary frictional coupling elements 92R in the direction of the axis C2. The armature 94R is splined on its outer circumferential surface to the inner circumferential surface of the large-diameter portion 63R of the clutch drum 60R. The solenoid coil 96R is fixed to the casing 74 so that the solenoid coil 96R is rotated with the casing 74.

In the right coupling 64R constructed as described above, the torque capacities of the auxiliary frictional coupling elements 92R and the main frictional coupling elements 82R are zero while the solenoid coil 96R is placed in a de-energized state without application of an electric current thereto. Accordingly, a drive force is not transmitted from the clutch drum 60R to the clutch hub 80R, so that the drive force of the engine 12 is not transmitted to the rear wheel 16R.

When the solenoid coil 96R is energized with application of an electric current thereto, on the other hand, a magnetic flux is generated around the solenoid coil 96R, so that the armature 94R is attracted toward the auxiliary frictional coupling elements 92R, so that the armature 94R presses the auxiliary frictional coupling elements 92R against each other. Accordingly, the auxiliary frictional coupling elements 92R have a torque capacity, so that the front and rear wheels 14 and 16 have a difference between their rotating speeds, whereby the first and second cam members 86R and 88R have a difference between their rotating speeds, and the balls 90R press the first cam member 86R toward the main friction coupling elements 82R, so that the first cam member 86R is moved toward the main friction coupling elements 82R, to press the main friction coupling elements 82R against each other. As a result, the main friction coupling elements 82R have a torque capacity, so that a drive force is transmitted from the clutch drum 60R to the clutch hub 80R through the main frictional coupling elements 82R. As the amount of electric current applied to the solenoid coil 96R increases, a force of attraction of the armature 94R increases, and the difference between the rotating speeds of the first and second cam members 86R and 88L increases, so that a force of the first cam member 86R to press the main frictional coupling elements 82R against each other increases. Accordingly, the torque capacity of the main frictional coupling elements 82R and the drive force to be transmitted from the clutch drum 60R to the clutch hub 80R through the main frictional coupling elements 82R increase with an increase of the amount of electric current applied to the solenoid coil 96R.

The second positive clutch 62 is a connecting/disconnecting clutch for selectively connecting and disconnecting the ring gear 68 meshing with the drive pinion 30, and the output shaft 70 splined to the clutch drums 60, to and from each other. The ring gear 68 has the cylindrical portion 100 extending in the direction of the axis C2, and is supported by a double-row angular ball bearing 102 at its cylindrical portion 100, rotatably about the axis C2. The output shaft 70 is a cylindrical member supported by the casing 74 at its opposite axial end portions via respective side bearings 104 and 106, rotatably about the axis C2.

The second positive clutch 62 is placed in the engaged state when the connecting/disconnecting sleeve 112 is located in its connecting position in which the internal teeth 66 of its cylindrical portion 100 are held in meshing engagement with the external teeth 78 of the connecting/disconnecting sleeve 112, and is placed in the released state when the connecting/disconnecting sleeve 112 is located in its disconnecting position in which the internal teeth 66 are not held in meshing engagement with the external teeth 78. It is noted that FIG. 2 shows the connecting/disconnecting sleeve 112 placed in its disconnecting position.

The switching mechanism 116 includes: a first cam member 118 disposed such that the first cam member 118 is rotated with the output shaft 70 and is movable relative to the output shaft 70 in the direction of the axis C2; a second cam member 120 disposed adjacent to the first cam member 118 in the direction of the axis C2; a plurality of balls 122 interposed between the first and second cam members 118 and 120; an annular member 124 which is L-shaped in an axial cross section and which is disposed radially outwardly of the second cam member 120 and fitted at its inner circumferential surface on the second cam member 120 such that the annular member 124 is rotated with the second cam member 120; a movable member 126 in the form of a disc splined on its inner circumferential surface to the outer circumferential surface of the annular member 124; a friction plate 127 having a disc shape and disposed adjacent to the movable member 126 in the direction of the axis C2 and splined on its outer circumferential surface to the casing 74; a solenoid coil 128 disposed on one side of the friction plate 127 remote from the movable member 126 in the direction of the axis C2; a piston 130 movable by the first cam member 118 in the direction of the axis C2; a synchronizer ring 132 held in abutting contact with the piston 130 via a thrust bearing and splined on its inner circumferential surface to the output shaft 70; a holder 134 disposed between the piston 130 and the first cam member 118; a spring 135 interposed between the holder 134 and the first cam member 118 and biasing the first cam member 118 toward the second cam member 120 in the direction of the axis C2; a spring 136 interposed between the side bearing 104 and the connecting/disconnecting sleeve 112; and a synchronizing mechanism 137 disposed between the synchronizer ring 132 and the ring gear 68.

The first cam member 118 is a cylindrical member which is splined on its inner circumferential surface to the output shaft 70 such that the first cam member 118 is rotated with the output shaft 70 and is movable relative to the output shaft 70 in the direction of the axis C2. The first cam member 118 has ball retainer grooves formed in its surface on the side of the second cam member 120 in the direction of the axis C2. The balls 122 are partially accommodated in the ball retainer grooves. The first cam member 118 has a cylindrical portion on its axial side remote from the second cam member 120 in the direction of the axis C2. This cylindrical portion extends in the direction of the axis C2, and comes into pressing contact at its axial end with the piston 130 when the first cam member 118 is moved in the direction of the axis C2 away from the second cam member 120.

The second cam member 120 is an annular member which is slidably fitted on its inner circumferential surface on the outer circumferential surface of the output shaft 70. The second cam member 120 has spline teeth splined on its outer circumferential surface to the annular member 124. The second cam member 120 has ball retainer grooves formed in its surface on the side of the first cam member 118 in the direction of the axis C2. The balls 122 are partially accommodated in the ball retainer grooves.

The plurality of balls 122 are interposed and sandwiched between the first and second cam members 118 and 120. Described more specifically, the balls 122 are partly accommodated in the ball retainer grooves formed in the first and second cam members 118 and 120. These ball grooves are formed in the circumferential direction of the first and second cam members 118 and 120, over a part of the circumference of each cam member 118, 120, such that the depth of each ball retainer groove decreases in the directions towards its opposite ends. When the first and second cam members 118 and 120 are rotated relative to each other, the balls 122 are moved toward one of the opposite ends of the ball retainer grooves, so that the balls 122 force the first and second cam members 118 and 120 so as to be moved away from each other in the opposite directions of the axis C2.

The annular member 124 is an annular member which is L-shaped in an axial cross section, and which is splined on its inner circumferential surface to the second cam member 120 so that the annular member 124 is rotated together with the second cam member 120. The movable member 126 takes the form of a disc which is splined on its inner circumferential surface to the outer circumferential surface of the annular member 124 so that the movable member 126 is rotated together with the annular member and is axially movable relative to the annular member 124 in the direction of the axis C2. The friction plate 127 is disposed between the movable member 126 and the solenoid coil 128 in the direction of the axis C2, and is splined on its outer circumferential surface to the casing 74 so that the friction plate 127 is held stationary while it is movable in the direction of the axis C2.

The solenoid coil 128 is disposed adjacent to the friction plate 127 in the direction of the axis C2, and is fixed to the casing 74 so that it is not rotatable. When the solenoid coil 128 is energized with an electric current applied thereto, magnetic flux is generated and the movable member 126 is attracted toward the solenoid coil 128. As a result, a frictional force is generated between the movable member 126 and the friction plate 127, so that rotating speeds of the movable member 126, annular member 124 and second cam member 120 are reduced or zeroed.

The piston 130 is an annular member slidably fitted on its inner circumferential surface on the output shaft 70. The piston 130 has a tooth formed on its end face opposed to the holder 134 in the direction of the axis C2, such that this tooth is engageable with teeth formed on the holder 134 as described below. The piston 130 is pressed by the cylindrical portion of the first cam member 118 so that the piston 130 is moved in the direction of the axis C2.

The synchronizer ring 132 is an annular member splined on its inner circumferential surface to the output shaft 70 so that the synchronizer ring 132 is rotated together with the output shaft 70 and is movable relative to the output shaft 70 in the direction of the axis C2. The synchronizer ring 132 has a tapered outer circumferential surface which slidably contacts a second friction member (described below) of the synchronizing mechanism 137.

The synchronizing mechanism 137 which functions to synchronize rotating speeds of the ring gear 68 and the output shaft 70 is disposed between the synchronizer ring 132 and the ring gear 68. The synchronizing mechanism 137 includes a first friction member having a tapered outer circumferential surface which is held in engagement with the synchronizer ring 132 for rotation together with the synchronizer ring 132 and which slidably contacts the inner circumferential surface of the ring gear 68. The synchronizing mechanism 137 further includes the above-indicated second friction member which is held in engagement with the ring gear 68 for rotation together with the ring gear 68 and which slidably contacts the tapered outer circumferential surface of the synchronizer ring 132. These first and second friction members slidably contact each other. When the piston 130 presses the synchronizer ring 132, there arise frictional forces among a contact surface of the second friction member contacting the synchronizer ring 132, a contact surface of the first friction member contacting the ring gear 68, and a contact surfaces of the first and second friction members contacting each other. These frictional forces permit synchronization of the rotating speeds of the ring gear 68 and the output shaft 70.

The holder 134 is an annular member which is fixed on its outer circumferential surface to the output shaft 70 such that the holder 134 is rotated together with the output shaft 70 and is moved together with the output shaft 70 in the direction of the axis C2. The holder 134 has the above-indicated teeth formed on its end face opposed to the piston 130 in the direction of the axis C2, such that these teeth are engageable with the above-indicated tooth of the piston 130. The teeth of the holder 134 are saw-teeth formed differently at intervals in its circumferential direction. Namely, the saw-teeth of the holder 134 consist of first and second teeth formed alternately in its circumferential direction so that the first and second teeth engage the tooth of the piston 130 to thereby hold the piston 130 at different positions in the direction of the axis C2. Described more specifically, when one of the first teeth is held in engagement with the tooth of the piston 130, the piston 130 (connecting/disconnecting sleeve 112) is held at its axial position in which the external teeth 78 of the connecting/disconnecting sleeve 112 and the internal teeth 66 of the ring gear 68 are not held in engagement with each other. When one of the second teeth is held in engagement with the tooth of the piston 130, the piston 130 (connecting/disconnecting sleeve 112) is held at its axial position in which the external teeth 78 of the connecting/disconnecting sleeve 112 and the internal teeth 66 of the ring gear 68 are held in engagement with each other. The tooth of the piston 130 and the teeth of the holder 134 have surfaces inclined in the circumferential direction so that the movement of the piston 130 by the first cam member 118 toward the side bearing 104 in the direction of the axis C2 causes releasing of the engagement of the tooth of the piston 130 with one of the first and second teeth of the holder 134, and subsequent reengagement of the tooth of the piston 130 with the other of the first and second teeth of the holder 134. Detailed description of geometric features of the inclined surfaces of the teeth of the piston 130 and the holder 134 is omitted since the geometric features are known in the art.

The spring 136 is interposed between an inner race 146 (shown in FIG. 3) of the side bearing 104 and the connecting/disconnecting sleeve 112, and biases the connecting/disconnecting sleeve 112, the synchronizer ring 132 and the piston 130 toward the side bearing 106 in the direction of the axis C2. Accordingly, the tooth of the piston 130 is held in engagement with one of the first and second teeth of the holder 134 while the piston 130 is not pressed and moved by the first cam member 118 in the direction of the axis C2.

In the switching mechanism 116 constructed as described above, application of an electric current to the solenoid coil 128 causes generation of a magnetic flux, and attraction of the movable member 126 toward the solenoid coil 128. Accordingly, a frictional force is generated between the movable member 126 and the friction plate 127, so that rotating speeds of the movable member 126, annular member 124 and second cam member 120 are reduced or zeroed. As a result, there arises a difference between the rotating speeds of the first cam member 118 and the second cam member 120, so that the first cam member 118 is pressed and moved by the balls 122 in the direction of the axis C2, and the piston 130 in abutting contact with the first cam member 118 is moved toward the side bearing 104 in the direction of the axis C2, against a biasing force of the spring 136. The movement of the piston 130 causes movements of the synchronizer ring 132 and the connecting/disconnecting sleeve 112 toward the side bearing 104 in the direction of the axis C2 in synchronization with the moment of the piston 130. In the process of the movement of the synchronizer ring 132, a frictional force is generated in the synchronizing mechanism 137, so that the rotating speeds of the ring gear 68, the synchronizer ring 132, the output shaft 70 and the connecting/disconnecting sleeve 112 are synchronized with each other, with the generated frictional force. At this time, the internal teeth 66 of the ring gear 68 and the external teeth 78 of the connecting/disconnecting sleeve 112 are engageable with each other. When the solenoid coil 128 is placed in the de-energized state, the connecting/disconnecting sleeve 112, the synchronizer ring 132 and the piston 130 are moved with the biasing force of the spring 136 toward the side bearing 106 in the direction of the axis C2, and the tooth of the piston 130 is brought into engagement with the second tooth of the holder 134, for example, so that the external teeth 78 of the connecting/disconnecting sleeve 112 and the internal teeth 66 of the ring gear 68 are brought into engagement with each other. Accordingly, the second positive clutch 62 is brought into its engaged state, so that the ring gear 68 and the output shaft 70 are rotated together with each other as a unit.

When the solenoid coil 128 is energized with application of an electric current thereto while the second positive clutch 62 is placed in the engaged state, the piston 130 is moved toward the side bearing 104 in the direction of the axis C2, and the engagement of the tooth of the piston 130 with the second tooth of the holder 134 is released. When the solenoid coil 128 is de-energized, the piston 130 is moved with the biasing force of the spring 136 toward the side bearing 106 in the direction of the axis C2, and the tooth of the piston 130 is brought into engagement with the first tooth of the holder 134, so that the external teeth 78 of the connecting/disconnecting sleeve 112 are brought into engagement with the internal teeth 66 of the ring gear 68. Accordingly, the second positive clutch 62 is brought into its released state. Thus, each time the solenoid coil 128 is energized and de-energized, the tooth of the piston 130 is alternately brought into engagement with one and the other of the first and second teeth of the holder 134, so that the second positive clutch 62 is alternately brought into its engaged and released states.

Figures 3, 4:
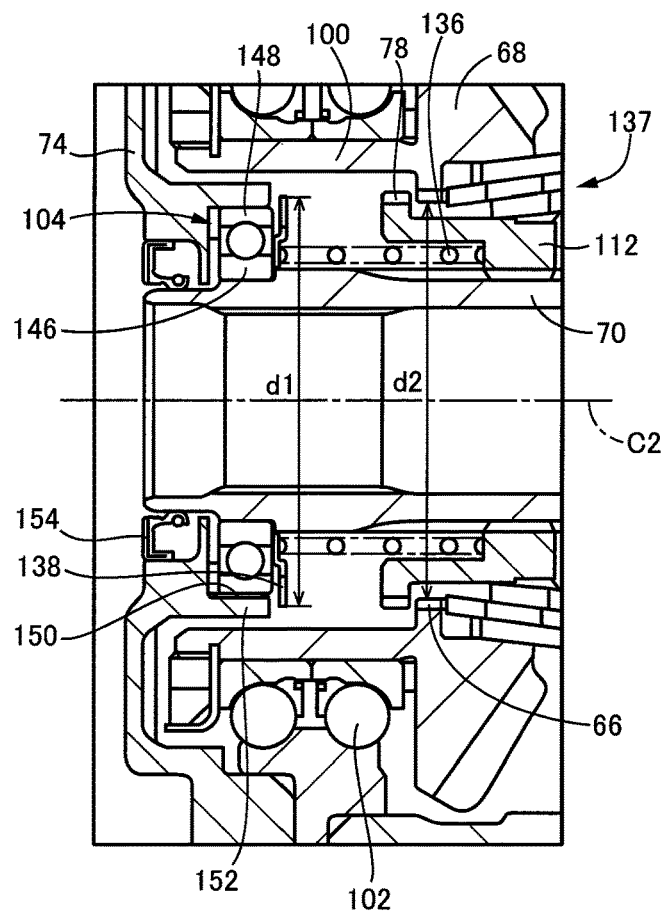
FIG. 3 is an enlarged view of a portion of the rear-wheel drive force distributing unit shown in FIG. 2, in which a side bearing for rotatably supporting an output shaft is disposed.
FIG. 4 is an enlarged cross sectional view showing in further enlargement a part of the portion of FIG. 3 in which the side bearing is disposed.

FIG. 3 is the enlarged view of a portion of the rear-wheel drive force distributing unit 34 shown in FIG. 2, in which the side bearing 104 for rotatably supporting the output shaft 70 is disposed, and FIG. 4 is the enlarged cross sectional view showing in further enlargement a part of the portion of FIG. 3 in which the side bearing 104 is disposed.

As shown in FIGS. 3 and 4, a side oil seal 154 is disposed adjacent to the side bearing 104 in the direction of the axis C2, and on one of the opposite sides of the side bearing 104 remote from the spring 136 in the direction of the axis C2. The side oil seal 154 is interposed between the output shaft 70 and the casing 74 in the radial direction, to prevent leakage of a lubricant from between the output shaft 70 and the casing 74 while permitting relative rotary motions of the output shaft 70 and the casing 74. An oil slinger 138 which is rotated together with the output shaft 70 is disposed adjacent to the side bearing 104 in the direction of the axis C2, and on the other side of the side bearing 104 remote from the side oil seal 154. The oil slinger 138 includes a radially inner portion 156 interposed between the inner race 146 of the side bearing 104 and the spring 136. Described more specifically, one of opposite surfaces of the radially inner portion 156 of the oil slinger 138 which are opposite to each other in the direction of the axis C2 is held in abutting contact with an axial end face of the inner race 146 of the side bearing 104, while the other surface of the radially inner portion 156 remote from the side bearing 104 in the direction of the axis C2 is held in abutting contact with the spring 136 so that the radially inner portion 156 is held in pressing contact with the inner race 146 of the side bearing 104 with the biasing force of the spring 136. The oil slinger 138 is bent so as to further include a radially outer portion 158 which is slightly spaced apart from the side bearing 104 in the direction of the axis C2 when the oil slinger 138 is installed in position. The inner race 146 is press-fitted on the output shaft 70 such that the inner race 146 is rotated together with the output shaft 70. Since the oil slinger 138 is held in pressing contact with the inner race 146 under a biasing action of the spring 136, the oil slinger 138 is rotated together with the inner race 146 and the output shaft 70. In this respect, it is noted that generation of noises and vibrations (so-called "NV phenomenon") that would take place due to direct collision of the expanded and compressed spring 136 with the inner race 146 is reduced owing to indirect abutting contact of the spring 136 with the side bearing 104 via the oil slinger 138.

The casing 74 has an inner circumferential surface in contact with an outer race 148 of the side bearing 104, which has a plurality of oil grooves 150 extending in the direction of the axis C2. That is, the casing 74 has a cylindrical retainer 152 extending in the direction of the axis C2, and the outer race 148 is fitted in the retainer 152 such that an outer circumferential surface of the outer race 148 is held in contact with an inner circumferential surface of the retainer 152. The retainer 152 has the plurality of oil grooves 150 formed in its inner circumferential surface in contact with the outer circumferential surface of the outer race 148, such that the oil grooves 150 extend in the direction of the axis C2 and are arranged in circumferential direction, so as to cover an entire axial length of the outer race 148 the outer circumferential surface of which is in contact with the inner circumferential surface of the retainer 152 (casing 74). That is, the oil grooves 150 extend in the direction of the axis C2 along the interface between the inner circumferential surface of the retainer 152 (casing 74) and the outer circumferential surface of the outer race 148. Accordingly, the lubricant can be delivered to the side oil seal 154 through the oil grooves 150.

Figure 5:
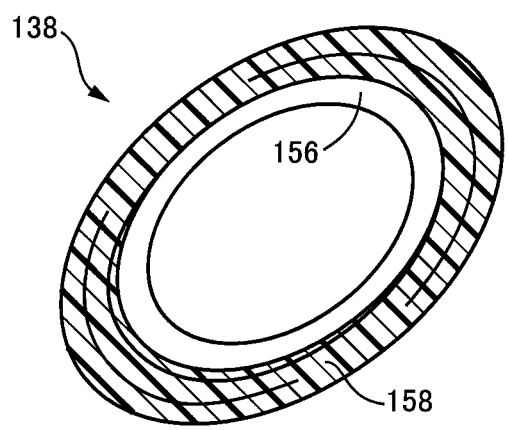
FIG. 5 is a perspective view of an oil slinger shown in FIG. 3.

FIG. 5 is the perspective view of the oil slinger 138. The oil slinger 138 takes the form of a disc. The radially inner portion 156 in the form of a disc in abutting contact with the inner race 146 is formed of a ferrous material, and the radially outer portion 158 is an elastic member formed of a rubber material bonded to the radially inner portion 156 in the process of vulcanization of the rubber material. As shown in FIG. 3, the oil slinger 138 has an outside diameter d1 which is larger than an inside diameter d2 of the internal teeth 66 of the ring gear 68, which inside diameter d2 is equal to the inside diameter of a portion of the ring gear 68 in which the first and second friction members of the synchronizing mechanism 137 are fitted. Namely, d1>d2. It is noted that the inside diameter d2 of the ring gear 68 is the smallest one of inside diameters of the ring gear 68.

The oil slinger 138 is installed in position after the ring gear 68 has been installed within the casing 74 as shown in FIG. 2. That is, the oil slinger 138 is moved within the ring gear 68 in a leftward direction as seen in FIGS. 3 and 4. During this movement of the oil slinger 138, the radially outer portion 158 of the oil slinger 138 interferes with the ring gear 68. Since the radially outer portion 158 of the oil slinger 138 is formed of a rubber material, however, the oil slinger 138 can be moved within the ring gear 68 and brought into its predetermined position of installation, while the radially outer portion 158 is elastically deformed so as to prevent an interference of the radially outer portion 158 with the ring gear 68. Therefore, the outside diameter d1 of the oil slinger 138 can be made larger than the inside diameter d2 of the ring gear 68, so that the radially outer portion 158 having the sufficiently large outside diameter d1 can be partly immersed by a sufficient depth in a mass of the lubricant staying within the rear-wheel drive force distributing unit 34, whereby the lubricant can be efficiently stirred up or splashed with a rotary motion of the oil slinger 138. It is noted that the ring gear 68 corresponds to an annular member within which the oil slinger 138 is moved during installation of the oil slinger 138, and that the inside diameter d2 is a smallest value of inside diameters of the annular member.

A function of the thus constructed oil slinger 138 will be described. In the 2-wheel-drive state of the vehicle 10, the first positive clutch 44 and the second positive clutch 62 are both placed in their released states, to hold the propeller shaft 28 stationary, for thereby preventing reduction of fuel economy of the vehicle 10 due to rotation of the propeller shaft 28 together with the rear wheels 16 in the 2-wheel-drive state. In this respect, it is noted that while the propeller shaft 28 is held stationary, the ring gear 68 is also held stationary. While the ring gear 68 is rotated, the lubricant staying within the rear-wheel drive force distributing unit 34 is delivered to the side oil seal 154 as a result of stirring of the lubricant by the rotating ring gear 68. While the ring gear 68 is held stationary, on the other hand, the lubricant cannot be delivered to the side oil seal 154 by the stationary ring gear 68.

In the rear-wheel drive force distributing unit 34 according to the present embodiment, the oil slinger 138 is rotated even while the ring gear 68 is held stationary. That is, the oil slinger 138 is rotated with the output shaft 70 to which rotary motions of the rear wheels 16 are transmitted through the left and right axles 36L and 36R and the left and right couplings 64L and 64R even while the ring gear 68 is held stationary.

The rotary motion of the oil slinger 138 causes stirring of the lubricant within the rear-wheel drive force distributing unit 34. The lubricant stirred up by the oil slinger 138 is delivered to the side oil seal 154 through the oil grooves 150 formed between the casing 74 and the outer race 148 of the side bearing 104. Accordingly, the side oil seal 154 can be lubricated with the lubricant stirred up by the oil slinger 138 even while the ring gear 68 is held stationary in the released states of the first and second positive clutches 44 and 62. In addition, the radially outer portion 158 of the oil slinger 138 is formed of the rubber material, so that the oil slinger 138 can be moved within the ring gear 68 during installation of the oil slinger 138, in spite of the outside diameter d1 of the oil slinger 138 larger than the inside diameter d2 of the ring gear 68, so that the lubricant can be sufficiently stirred up by the oil slinger 138 having the sufficiently large outside diameter d1. Thus, the oil slinger 138 has not only a function of a shim for reducing the vibrations and noises caused by the spring 136, but also a function to stir up the lubricant. Even when the left and right couplings 64L and 64R are placed in their released states while the ring gear 68 is held stationary, rotary motions of the rear wheels 16 are transmitted to the output shaft 70, owing to a dragging torque generated by the inner friction plates and the outer friction plates of the main frictional coupling elements 82 which are rotated relative to each other.

As described above, the present embodiment is configured such that the oil slinger 138 is disposed axially adjacent to the side bearing 104, such that the oil slinger 138 is rotated with the output shaft 70. Accordingly, the lubricant within the rear-wheel drive force distributing unit 34 is stirred up by the rotating oil slinger 138, so that the side oil seal 154 is lubricated with the lubricant, whereby the side oil seal 154 is lubricated even while the ring gear 68 is held stationary.

The present embodiment is further configured such that the lubricant stirred up by the rotating oil slinger 138 can be delivered to the side oil seal 154 through the oil grooves 150. Further, the radially outer portion 158 of the oil slinger 138 is formed of a rubber material, so that the oil slinger 138 can be installed owing to elastic deformation of its radially outer portion 158 even where the outside diameter of the radially outer portion 158 is larger than the inside diameter of the ring gear 68. In addition, the radially inner portion 156 of the oil slinger 138 is held in pressing contact with the inner race 146 of the side bearing 104 with the biasing force of the spring 136, so that the oil slinger 138 can be rotated together with the inner race 146 and the output shaft 70 as a unit.

While the preferred embodiment has been described in detail by reference to the drawings, it is to be understood that the invention may be otherwise embodied.

In the illustrated embodiment, the oil grooves 150 are formed in the casing 74, so as to extend in the direction of the axis C2. However, the oil grooves 150 need not be parallel to the axis C2. Further, the oil grooves 150 may have any configuration, as long as the oil grooves 150 are formed in one of mutually contacting circumferential surfaces of the outer race 148 of the side bearing 104 and the retainer 152 of the casing 74. Furthermore, the plurality of oil grooves 150 may be replaced by a single oil groove.

In the illustrated embodiment, the outside diameter d1 of the radially outer portion 158 of the oil slinger 138 is larger than the inside diameter d2 of the ring gear 68. However, the outside diameter d1 of the radially outer portion 158 may be smaller than the inside diameter d2 of the ring gear 68, provided the oil slinger 138 can sufficiently stir up the lubricant. In this instance, the radially outer portion 158 does not interfere with a radially inner portion of the ring gear 68 during installation of the oil slinger 138, so that the radially outer portion 158 may be formed of a material other than a rubber material.

In the illustrated embodiment, the radially outer portion 158 of the oil slinger 138 is formed of a rubber material. However, the radially outer portion 158 may be formed of any other elastic material such as a resinous material, as long as the radially outer portion 158 is elastically deformable during installation of the oil slinger 138. Further, the oil slinger 138 in the illustrated embodiment takes the form of a circular disc. However, the oil slinger may take any other form. For instance, the oil slinger has a radially outer portion having a polygonal shape.

While the preferred embodiment of the invention and its modifications have been described by reference to the drawings, for illustrative purpose only, it is to be understood that the present invention may be embodied with various other changes and improvements which may occur to those skilled in the art.

NOMENCLATURE OF ELEMENTS

10: 4-wheel-drive vehicle
12: Engine (Drive power source)
14: Front wheels (Main drive wheels)
16: Rear wheels (Auxiliary drive wheels)
28: Propeller shaft
34: Rear-wheel drive force distributing unit (Differential device for 4-wheel-drive vehicle)
68: Ring gear (Annular member)
70: Output shaft
74: Casing
104: Side bearing
136: Spring
138: Oil slinger
146: Inner race
150: Oil groove
154: Side oil seal
158: Radially outer portion

What is claimed is:
1. A differential device for a 4-wheel-drive vehicle wherein a portion of a drive force of a drive power source transmitted to left and right main drive wheels is transmitted to left and right auxiliary drive wheels through a propeller shaft which is disconnectable from a power transmitting path between the main drive wheels and the drive power source, the differential device being configured to distribute the drive force from the propeller shaft to the left and right auxiliary drive wheels, and to selectively connect and disconnect the propeller shaft and an output shaft to and from each other, the output shaft being operatively connected to the left and right auxiliary drive wheels, the differential device comprising:

a side oil seal disposed between the output shaft and a casing;

a side bearing disposed adjacent to the side oil seal in an axial direction of the output shaft, such that the output shaft is supported by the casing via the side bearing; and an oil slinger disposed axially adjacent to the side bearing, such that the oil slinger is rotated with the output shaft, wherein the oil slinger comprises a disc having a radially outer portion which is an elastic member, and the oil slinger has an outside diameter larger than a smallest one of inside diameters of a ring gear within which the oil slinger is moved when the oil slinger is installed in position.

2. The differential device according to claim 1, wherein the oil slinger is disposed on one side of the side bearing remote from the side oil seal, and the casing has oil grooves formed in a surface thereof in contact with the side bearing, such that the oil grooves extend in the axial direction of the output shaft.

3. The differential device according to claim 2, wherein the oil slinger has a radially inner portion interposed between an inner race of the side bearing and a spring, and the radially inner portion of the oil slinger is held in pressing contact with the inner race of the side bearing with a biasing force of the spring.

4. The differential device according to claim 1, wherein the oil slinger has a radially inner portion interposed between an inner race of the side bearing and a spring, and the radially inner portion of the oil slinger is held in pressing contact with the inner race of the side bearing with a biasing force of the spring.

5. The differential device according to claim 1, wherein a radially inner portion of the oil slinger is a ferrous material.

6. The differential device according to claim 1, wherein the oil slinger is configured to lubricate the side oil seal.

* * * * *